United States Patent [19]

Ishikawa

[11] 4,311,574

[45] Jan. 19, 1982

[54] REGENERATION OF PHOTOGRAPHIC PROCESSING SOLUTIONS

[75] Inventor: Takatoshi Ishikawa, Minami-ashigara, Japan

[73] Assignee: Fuji Photo Film Co., Ltd., Kanagawa, Japan

[21] Appl. No.: 181,554

[22] Filed: Aug. 27, 1980

[30] Foreign Application Priority Data

Aug. 27, 1979 [JP] Japan ............................... 54/109448

[51] Int. Cl.[3] ............................................ B01D 13/02

[52] U.S. Cl. ................................. 204/180 P; 204/94; 204/109; 204/301

[58] Field of Search .................... 204/180 P, 301, 109, 204/111, 46 R, 94

[56] References Cited

U.S. PATENT DOCUMENTS 4,145,271 3/1979 Nosse et al. ..................... 204/180 P

OTHER PUBLICATIONS

The Dow Chemical Co., "Dowex :: Ion Exchange", 1958, Midland, Michigan.

*Primary Examiner*—Arthur C. Prescott
*Attorney, Agent, or Firm*—Sughrue, Mion, Zinn, Macpeak & Seas

[57] ABSTRACT

A method for regenerating a photographic processing solution is disclosed, comprising bringing the photographic processing solution into contact with a particular styrenedivinylbenzene copolymer, and then subjecting the photographic processing solution to ion exchange membrane electrophoresis.

2 Claims, 1 Drawing Figure

REGENERATION OF PHOTOGRAPHIC PROCESSING SOLUTIONS

BACKGROUND OF THE INVENTION

1. Field of the Invention

This invention relates to re-utilization of a used photographic processing solution, or economical use of a photographic processing solution. Particularly, it is concerned with a method for effectively re-utilizing a used photographic processing solution by removing therefrom substances which are eluted from a light-sensitive material in the photographic processing solution and which are harmful for photographic processings. More particularly it is concerned with a method for selectively removing from a used photographic processing solution those compounds having relatively high molecular weights, such as polymer compounds and surface active agents, which accumulate during photographic processings.

2. Description of the Prior Art

In forming images by processing an imagewise exposed photographic light-sensitive material, various processing solution may be required, such as a developer, a fixer, a stop solution, a bleaching solution, a bleachfixer, a hardening solution, a neutralizer, a postbath solution, a stabilizer, etc.

Processing solutions which have been used in development processing steps or which overflow processing vessels when such vessels are replenished, depending upon the particular process of the developing processing, have hitherto been disposed as a used processing solution, either as is or after being processed so as not to cause environmental pollutions.

These used processing solutions, however, still contain a large amount of processing components which have not been consumed during the processing. Therefore, the disposal of such used processing solusions is not preferred with respect to the effective utilization of resources, and it is disadvantageous from an economic viewpoint. Additionally, the application of such treatments so as to prevent environmental pollution results in increases in investment and overall production costs.

A method is known in which a processing solution that has been used for processing or an overflow solution from a processing vessel due to replenishment during the processing (hereinafter generically referred to as a "used solution") is reused after the removal of those components unnecessary or harmful with repect to the processing, and, if necessary, after replenishment of those components in which the solution is deficient.

The components which accumulate in the overflow solution and which are unnecessary or are harmuful with respect to processing include oxidation products of a developing agent, preservative, hydrogen ions, water-soluble salts, e.g., halogen ions (which are eluted from a light-sensitive material), surface active agents, water-soluble polymer compounds, dyes and other water-soluble additives. For example, the oxidation product of the developing agent in the processing solution causes fog, the other salts change photographic performance, and the surface active agents not only change photographic performance, but also render the processing solution subject to bubble formation, causing various hindrances during the processing. Of these components, halogen ions exert the most severe influences on the photographic performance.

As a method of removing such halogen ions from the photographic processing solution, an ion exchange resin method and an ion exchange membrane electrophoresis method are known.

In the ion exchange resin method, it is difficult to keep the amount of halogen ions being removed at a constant level, since the ion exchange capability of the ion exchange resin decreases with the use thereof. This makes it difficult to keep the photographic performance at a constant level. Furthermore, this method removes developing agents, such as hydroquinones and the like, which are relatively expensive and are necessary for re-use of the developing solution.

In accordance with the ion exchange membrane electrophoresis method, it is relatively easy to control the amount of halogen ions being removed, since the amount attains equilibrium after a certain period of time, although it abruptly changes at the beginning of the electrophoresis. Moreover, almost no developing agents are removed. It is, therefore, preferred to employ ion exchange membrane electrophoresis for the removal of halogen ions from the photographic processing solution.

However, while the ion exchange membrane electrophoresis method is effective for removing the halogen ions from the processing solution, it has the disadvantage that the efficiency of electrophoresis decreases with the repeated uses thereof. When the processing solution which has been used for processing a light-sensitive material is subjected to electrophoresis, the current efficiency, in particular, markedly decreases. At this point, the electrophoresis method cannot be used for the removal of salts such as halogen compounds and the like in the processing solution.

For the removal of those components which exert adverse influences on the electrophoresis method, various methods have hitherto been proposed, including a method as described in Japanese patent application (OPI) No. 146236/77 (the term "OPI" as used herein refers to a "published unexamined Japanese patent application") wherein a waste developer is brought into contact with a chelate resin and/or a week acidic cation exchange resin to control the formation of floating materals, a method as described in Japanese patent application (OPI) No. 46732/78 wherein a colored developer is brought into contact with a polymeric substance to remove the oxidation product of a developing agent and its derivatives, and a method as described in Japanese patent application (OPI) No. 19741/79 wherein a waste developer is brought in contact with an anion exchange member to remove colored substances in the waste developer.

Even if the methods as described above are applied prior to the electrophoresis of the used photographic processing solution, a gradual descrease in the efficiency of electrophoresis often occurs in practical operation, interfering with the continuation of the electrophoresis.

SUMMARY OF THE INVENTION

The principal object of this invention is to provide a method for more effectively re-utilizing a used processing solution. In particular, this invention is intended to provide a method for regeneration of a used processing solution wherein an ion exchange membrane electrophoresis method is employed in which the ion exchange of the ion exchange membrane is prevented from decreasing.

The above-object is attained by bringing the photographic processing solution into contact with a porous styrene-divinylbenzene copolymer having a pore radius of from about 300 Å to 700 Å and then subjecting it to electrophoresis.

This invention, therefore, provides a method for regeneration of a used photographic processing solution comprising bringing the used photographic processing solution into contact with a porous styrene-divinylbenzene copolymer having a pore radius of from about 300 Å to 700 Å, and then subjecting the used processing solution to ion exchange membrane electrophoresis.

DETAILED DESCRIPTION OF THE INVENTION

Figure 1:
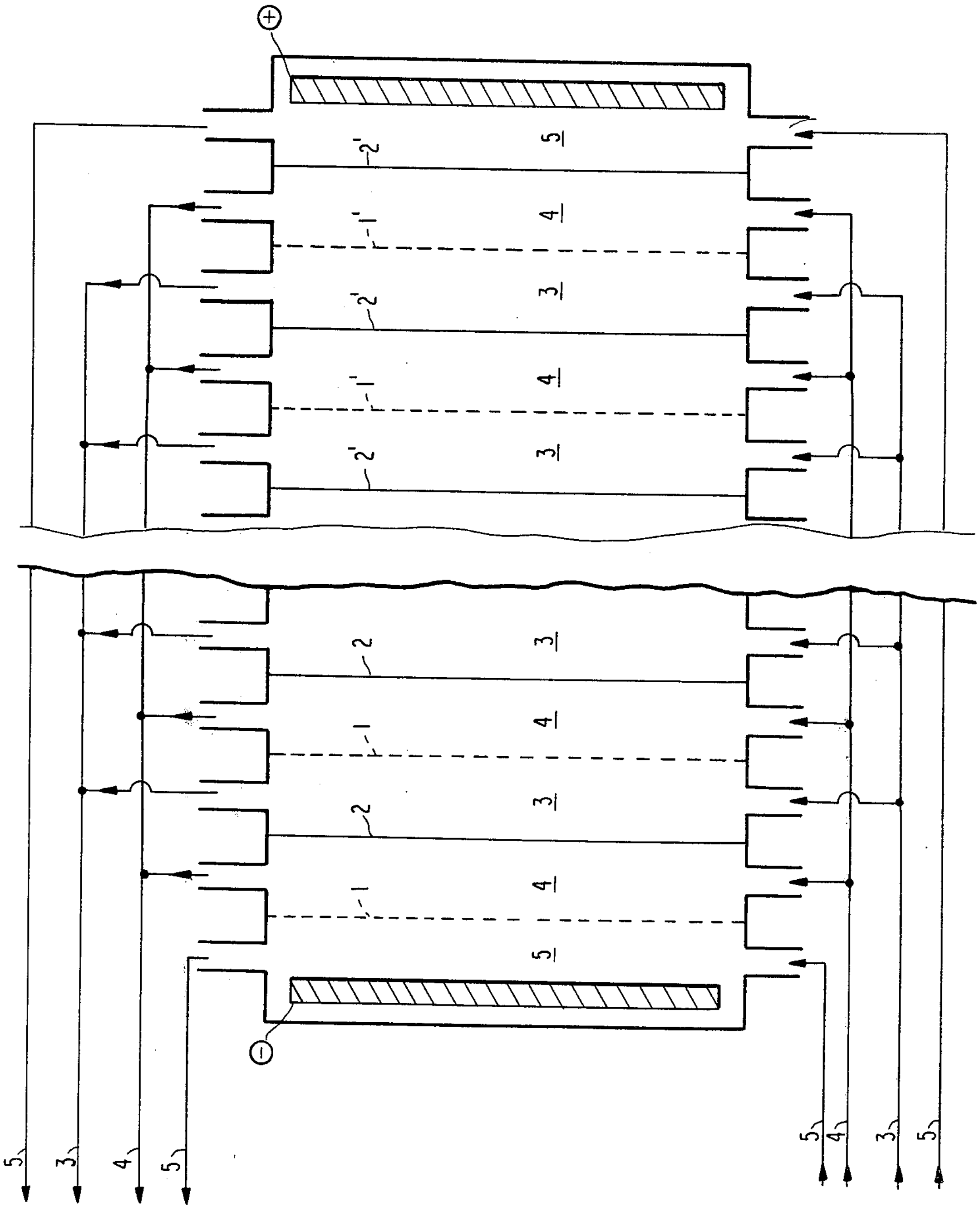
FIG. 1 schematically illustrates a cross-sectional side view of an ion exchange membrane electrophoresis vessel, which comprises anion exchange membrances 1, cation exchange membrances 2, a diluting solution 3, a condensing solution 4 and an electrode solution 5.

For selectively removing those compounds which are eluted from a light-sensitive material during the processing thereof and interfere with ion exchange membrane electrophoresis without removing those components which are contained in a processing solution and are needed for the re-use thereof, e.g., a developing agent and the like, it is required that the pore radius be within the range of from about 300 Å to 700 Å.

Outside of this range, the objects of this invention cannot be attained.

The porous styrene-vinylbenzene copolymer as used in this invention preferably has a specific surface area of from about 100 to 1,000 $m^2/g$ and a pore volume of from about 0.6 to 1.2 ml/g, and it more preferably has a specific surface area of from about 400 to 700 $m^2/g$ and a pore volume of from about 0.8 to 1.0 ml/g in that such a polymer has excellent absorption capabilities.

As a result of extensive investigations, it has now been found that the porous styrenevinylbenzene copolymer as used in this invention has the effect of removing polymeric compounds which are eluted from the light-sensitive material in the processing solution, e.g., water-soluble polymer compounds and surface active agents. That is, polymeric compounds, e.g., water-soluble polymer compounds which are eluted from the light-sensitive material in the processing solution and surface active agents which are used in the light-sensitive layer and are eluted similarly, which are separated only with difficulty from aqueous solutions thereof by known procedures, can be efficiently removed by the method of this invention.

Furthermore, since the copolymer used in this invention has no electric changes unlike ion exchange resins, it can selectively remove those compounds having greater molecular weights than conventional surface active agents irrespective of the electric charge of the substances to be removed. For examples, an alkylarylsulfonic acid salt, a high aliphatic acid salt, a polyalkyleneoxide, polyethylene glycol, polyglycerol, cane sugar, an acrylic acid series polymer, a methacrylic acid series polymer, a maleic anhydride series polymer, a maleic acid series polymer, a styrenesulfonic acid series polymer, a vinylbenzic series acid, a phenol series polymer, a silicone series compound, an N-vinylpyrrolidone series polymer, an acrylonitrile series polymer, or a vinyl alcohol series polymer can be removed.

The porous styrene-divinylbenzene copolymer as used in this invention can be produced by various methods. In general, the following methods can be employed for the synthesis of porous copolymers; (1) a method in which the components thereof are polymerized in the presence of a non-reactive (i.e., taking no part in the polymerization) diluent; (2) a method in which the components thereof are polymerized in the presence of a polymer compound taking no part in the polymerization reaction; and (3) a method in which the polymerization is carried out in the system wherein a polymer compound and a diluent are present at the same time.

In the method (1), in which the polymerization is carried out in the system wherein a diluent taking no part in the polymerization is present, a nonsolvent which takes no part in the polymerization (that is, is a good solvent for the monomer and has no or only a poor capability for swelling the polymer or copolymer formed) is added to the components of the polymerization system, which is them copolymerized to form a porous structure.

Diluents which can be used in this method include alcohols such as tert-anylalcohol, sec-butylalcohol, etc., aliphatic hydrocarbons such as hexane, isooctane, etc., and aromatic hydrocarbons such as toluene, ethylbenzene, diethylbenzene, etc. This diluent is preferably added in an amount of from 20% to 50% by volume, based upon the volume of the system participating in the polymerization reaction.

A most suitable diluent can be selected, taking in consideration factors such as the ratio of styrene to divinylbenzene, the reaction temperature, the reaction time, etc., by those skilled in the art.

In the method (2), wherein the polymerization is carried out in the presence of a linear polymer compound taking no part in the polymerization, a linear polymer compound, e.g., an ethyl maleate-vinyl acetate copolymer, an ethyl maleate-methyl methacrylate copolymer, an ethyl maleate-acrylonitrile copolymer, polyethylene glycol (molecular weight, about 20,000) or polystyrene (molecular weight, about 50,000 to 100,000), is added, as a kind of filler, to the monomer system to be polymerized and after the polymerization the linear polymer compound which does not take part in the polymerization reaction, is eluted to obtain a porous copolymer.

In the method (3), in which the polymerization is carried out in the system wherein a linear polymer compound and a diluent are present at the same time, the linear polymer compound as described above is used in combination with dichloroethane, an aromatic hydrocarbon, e.g., xylene, toluene, etc., or the like to thereby obtain a copolymer having a porous structure.

In the practice of this invention, the photographic processing solution may be brought into contact with the styrene-divinylbenzene copolymer by any method. For example, the styrene-divinylbenzene copolymer may be placed in the development processing bath, or it may be contacted with processing solution obtained by collecting processing solution which overflows a processing vessel as a result of replenishment. The contact between the processing solution and the styrene-divinylbenzene copolymer may be carried out either continuously or batchwise. Additionally, a so-called "column" method may be used in which the styrene-divinylbenzene copolymer is packed in a cylindrical vessel to form a layer of the copolymer through which the processing solution is passed downwardly or upwardly.

The ion exchange membrane electrophoresis can be carried out by any method so long as it is able to remove halogen ions. Together with such halogen ions, the pair ions thereof (that is, corresponding cations) and other inorganic ions may be removed. In more detail, it is preferred to employ those methods as described in Japanese patent application (OPI) Nos. 119934/77, 26542/76 and 85722/76, hereby incorporated by reference.

In the regeneration of a used photographic processing solution according to the method of this invention, the used photographic processing solution which has been brought into contact with the porous styrene-divinylbenzene copolymer and subjected to the subsequent ion exchange membrane electrophoresis is preferably supplied with those components which are dificient in the used processing solution. The thus-obtained processing solution can be used directly in the photographic processing, or it can be used as a replenishing solution.

The porous styrene-divinylbenzene copolymer as used in this invention can be repeatedly used by bringing it into contact with a polar solvent, e.g., water, methanol, acrylonitrile, etc., to remove or desorb those substances which are adsorbed on the copolymer during contact with the used processing solution. Where substances having electric charges are adsorbed on the copolymer, the polar solvent may be used after being adjusted to a suitable pH value. For example, when the copolymer is used for regeneration of a used developing agent, the polar solvent may be used after being adjusted to a pH value of 1.

The method of this invention can be applied to any processing solutions which are used in the processing of black and white or color, negative or positive, light-sensitive material, including reversal light-sensitive material, autopositive light-sensitive material, lith type light-sensitive material, autoradiograph light-sensitive material, etc., so long as the photographic processing solutions contain the polymer compounds as described above and/or surface active agents which are used for processing silver halide light-sensitive materials. The effect of this invention is particularly great when it is applied to a used developer as used in a light-sensitive material containing a water-soluble polymer substance which is easily eluted in the developer. In more detail, the method of this invention is preferably applied to those used developers as are used in the processing of a 8 mm, 16 mm, and 35 mm light-sensitive material for movies and television.

The following examples are provided to illustrate this invention in greater detail.

EXAMPLE 1

A solution was prepared containing the following preportions of ingredients:

| | |
|---|---|
| Sodium Tetrapolyphosphate | 2.0 g |
| Sodium Hydrogensulfite | 3.0 g |
| 1-Phenyl-3-pyrazolidone | 0.4 g |
| Anhydrous Sodium Sulfite | 44.0 g |
| Hydroquinone | 7.0 g |
| Sodium Carbonate Monohydrate | 33.0 g |
| Potassium Thiocyanate (1 N) | 17.5 ml |
| Sodium Bromide | 0.2 g |
| Sodium Iodide | 7.0 mg |

-continued

| | |
|---|---|
| Water to make | 1 liter |

From these ingredients, 100 l of a developer (i.e., developing solution) was prepared. By use of this developer, Fujichrome R-25 film (8 mm color reversal photographic film for movies) was processed at a ratio of 100 $m^2$ per liter of the developer, to obtain 50 l of used developer.

A glass tube with an inner diameter of 5 cm was packed with 1,000 ml of a styrene-divinylbenzene copolymer (spherical; average diameter: about 1 mm; specific surface area: 589.8 $m^2/g$; volume of pores: 0.874 ml/g; center of distribution of pore's radius: 500 Å). Through this column 25 l of the above used developer was passed. At this time, while controlling the amount of the used developer passing through the column by used of a needle valve provided at an outlet of the column, the developer was passed therethrough at a substantially equal speed over a period of 180 minutes.

Analysis of the components in the developer prior to and after the passage thereof through the column confirmed that there were substantially no changes in the components of the developer between prior to the passage thereof through the column and after the passage thereof through the column. However, the water-seluble polymer substances which were eluted from the light-sensitive material in the developer could be removed by the passage through the column.

Thereafter, 25 l of each of the developer which was passed through the column and the developer which was not passed through the column was subjected to ion exchange membrane electrophoresis under the same conditions to remove the halogen ions contained therein. This ion exchange membrane electrophoresis was curred out in an ion exchange membrane electrophoresis vessel (as shown in FIG. 1), in which 10 pairs of 2 $dm^2$ anion exchange membrances 1 and 2 $dm^2$ cation exchange membranes 2 were placed; the developer was used as a diluting solution 3 and a 10% aqueous solution of sodium carbonate was used as a condensing solution 4 and an electrode solution 5; the amount of all the solution being recycled was controlled to 8 l/min; and the current density was maintained at 1.5 $A/dm^2$ by use of a constant-current apparatus.

In the case of the developer which was not passed through the column, the electric voltage gradually increased and after 240 minutes from the start of the electrophoresis, it became impossible to carry out the electrophoresis. On the other hand, in the case of the developer which was passed through the column, the electric voltage remained substantially constant even after 480 minutes from the start of the electrophoresis, and no hindrances occurred in the continuation of the ion exchange membrane electrophoresis.

The amount of sodium bromide removed in each case is shown in Table 1.

TABLE 1

| Time of Electrophoresis (min) | Amount of Sodium Bromide removed when Developer is subjected to Electrophoresis prior to or after Passage thereof through Column (g/l) | | | | | | | |
|---|---|---|---|---|---|---|---|---|
| | 30 | 60 | 90 | 120 | 150 | 180 | 210 | 240 |
| Developer | | | | | | | | |

TABLE 1-continued

| Time of Electrophoresis (min) | 30 | 60 | 90 | 120 | 150 | 180 | 210 | 240 |
|---|---|---|---|---|---|---|---|---|
| | Amount of Sodium Bromide removed when Developer is subjected to Electrophoresis prior to or after Passage thereof through Column (g/l) | | | | | | | |
| prior to Passage through Column (g/l) | 0.08 | 0.18 | 0.25 | 0.35 | 0.42 | 0.50 | 0.58 | 0.65 |
| Developer after Passage through Column (g/l) | 0.20 | 0.45 | 0.65 | 0.85 | 1.02 | 1.18 | 1.32 | 1.45 |

From the results as illustrated in Table 1, it can be seen that the amount of sodium bromide removed from the developer which was passed through the column was about twice the amount removed from the developer which was not passed through the column.

On adding 10 to 20 ppm of a cation flocculant, Accofloc C-577 (produced by Japan Cyanamide Co., Ltd.) to the developer which was passed through the column and the developer which was not passed through the column, the former developer was free from turbidity whereas the latter developer became turbid. Therefore, it appears that anionic polymeric substances contained in the developer are removed by bringing the developer into contact with the styrenedevinylbenzene copolymer.

On bubbling nitrogen gas through a sintered glass tube into both the developer which was passed through the column and the developer which was not passed through the column, almost no foaming was observed in the former developer whereas extensive foaming occurred in the latter developer. This indicates that surface active agents contained in the developer are removed by passing the developer through the column.

COMPARATIVE EXAMPLE

By using the same styrene-divinylbenzene copolymer as used in Example 1, a column was produced in the same manner as in Example 1. Through this column was passed the used developer obtained by the same manner as in Example 1, and the changes in the components from before passage through the column and after passage through the column were measured.

For comparision, the following substances (1) to (5) were used and the changes in the components were measured in the same manner as above.

The concentration of the anionic polymer substance was indicated by the turbidity when 20 ppm of the same cation flocculant as used in Example 1 was added; that is, wherein the turbidity of the used developer as in Example 1 prior to the passage through the column is taken as 100%, and the turbidity after passage through the column is taken as 0%.

POLYMER SUBSTANCES USED (1) SA-21A (as described in Japanese patent application (OPI) No. 19741/79) Gel strong basic anion exchange resin (produced by Mitsubishi Chemical Industries, Ltd.)

(2) WA-406 Gel weak basic anion exchange resin (produced by Mitsubishi Chemical Industries, Ltd.)

(3) Amberlight IRA:68 Anion exchange resin (produced by Rohm & Haas Co.)

(4) Amberlight IRA-400 Strong basic gel anionic exchange resin (produced by Rohm & Haas Co.)

(5) Nylone 6 fiber (as described in Japanes patent application (OPI) No. 46732/78) Worldknit (produced by Toray Co.)

(6) Styrene-divinylbenzene Copolymer (as used in Example 1) The results are shown in Table 2.

As can be seen from Table 2, the used of these anion Exchange resins and polymer fiber permit the removal of major components such as a developing agent, etc. whereas they cannot remove at all the polymer substances. Furthermore, when the developer, after being passed through these columns, was subjected to electrophoresis by the ion exchange membrane electrophoresis method, the voltage markedly increased, and in about from 240 to 300 minutes electrophoresis became impossible.

TABLE 2

| Used polymer substances | Amount Prior* | SA-21A (Comparison) | WA-406 (Comparison) | Amberlight IRA-68 (Comparison) | Amberlight IRA-400 (Comparison) | Nylon 6 Fiber (Comparison) | Styrene-divinyl-Benzen Copolymer (This invention) |
|---|---|---|---|---|---|---|---|
| | | Amount of Component after Passage through Column | | | | | |
| Hydroquinone (g/l) | 3.73 | 2.25 | 2.41 | 3.43 | 2.30 | 3.18 | 3.58 |
| Sodium Bromide (g/l) | 2.66 | 2.45 | 2.58 | 2.63 | 1.25 | 2.66 | 2.66 |
| Sodium Sulfite (g/l) | 42.9 | 40.2 | 41.6 | 42.0 | 42.2 | 42.2 | 42.7 |
| Anionic Polymer Substance (Relative Value) | 100 | 100 | 100 | 100 | 100 | 100 | 0 |

*i.e. the amount of component prior to passage through the column

While the invention has been described in detail and with reference to specific embodiments thereof, it will be apparent to one skilled in the art that various changes and modifications can be made therein without departing from the spirit and scope thereof.

What is claimed is:

1. A method for regenerating a used photographic processing solution comprising bringing the used photographic processing solution into contact with a styrenedivinylbenzene copolymer having a pore radius of from about 300 Å to 700 Å, said copolymer having no electric charges, and then subjecting the used processing solution to ion exchange membrane electrophoresis.

2. A method for regenerating a used photographic processing solution as in claim 1, wherein the styrenedivinylbenzene copolymer has a specific surface area of from about 100 to 1,000 $m^2/g$ and a pore volume of from about 0.6 to 1.2 ml/g.

* * * * *